(12) United States Patent  (10) Patent No.: US 6,983,726 B1
Luo et al.  (45) Date of Patent: Jan. 10, 2006

(54) ENGINE EXHAUST STARTUP MONITORING SYSTEM

(75) Inventors: Yi Luo, Ypsilanti, MI (US); Qingfeng Tang, Novi, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/982,127

(22) Filed: Nov. 5, 2004

(51) Int. Cl.
*F02N 11/08* (2006.01)
*F24F 11/00* (2006.01)
*G08B 17/117* (2006.01)

(52) U.S. Cl. .................. 123/179.2; 49/31; 340/632; 454/343; 701/2

(58) Field of Classification Search ............... None
See application file for complete search history.

(56) References Cited

U.S. PATENT DOCUMENTS

| | | | |
|---|---|---|---|
| 4,866,434 A | 9/1989 | Keenan | |
| 5,199,397 A | 4/1993 | Shelef et al. | |
| 5,564,101 A | 10/1996 | Eisfeld et al. | |
| 5,576,739 A | 11/1996 | Murphy | |
| 5,790,948 A | 8/1998 | Eisfeld et al. | |
| 5,955,031 A | 9/1999 | King, Jr. | |
| 6,040,636 A | 3/2000 | DiCroce | |
| 6,072,404 A | 6/2000 | Nolan et al. | |
| 6,110,038 A | 8/2000 | Stern | |
| 6,208,256 B1 * | 3/2001 | Fleming et al. | ............. 340/632 |
| 6,448,888 B1 | 9/2002 | Horner et al. | |

* cited by examiner

*Primary Examiner*—Andrew M. Dolinar
(74) *Attorney, Agent, or Firm*—MacMillan, Sobanski & Todd, LLC

(57) ABSTRACT

A method is provided for monitoring and mitigating exhaust gas emitted from a vehicle in a closable structure. A remote monitoring device within the closable structure is trained in response to a training signal transmitted from a remote transmitter device. A remote engine start signal is intercepted within a receiving circuit of the remote monitoring device during an actual remote engine start operation. The exhaust gas emitted from the vehicle is monitored in response to receiving the remote engine start signal. A determination is made if an exhaust gas concentration level is greater than a predetermined threshold. A control signal is transmitted to a mitigation device for mitigating the exhaust gas within the closable structure when the exhaust gas concentration level is greater than the predetermined threshold.

20 Claims, 4 Drawing Sheets

ENGINE EXHAUST STARTUP MONITORING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to vehicle exhaust monitoring and mitigation in a closable structure.

2. Description of the Related Art

Vehicle systems are known to include remote vehicle start devices which allow an operator of a vehicle to start the vehicle from a remote location. Remote starting of the engine allows the engine to warm up so that forced air output from the climate control system at a desired temperature can pre-heat or pre-cool the vehicle cabin prior to the user entering the vehicle.

An issue with using a remote start system is during periods when the vehicle is parked in a closable structure such as a garage without proper ventilation. Exhaust fumes (e.g., carbon monoxide) generated by the vehicle exhaust system may increase to unsafe levels without proper ventilation. Such instances may occur when a person remotely starts the vehicle and waits a period of time before entering garage or if the remote start is unintentionally activated. In such situations, the garage or attached building as well as the interior of the vehicle may be filled with hazardous exhaust fumes.

Such unsafe conditions have been safeguarded by safety systems that are responsive to unsafe exhaust gas concentration levels within a garage by either turning off the engine of the vehicle and/or activating some type of ventilation system such as an exhaust fan or opening the garage doors. Such systems have utilized an exhaust monitoring device mounted inside the garage and may react to the unsafe condition by ventilating the garage through the use of a ventilation unit. However, this does not necessarily terminate the source of the hazardous exhaust gas such as the engine. Furthermore, such systems continuously monitor the exhaust levels in the garage continuously even when no vehicle is present within the garage. This is a constant waste of power to monitor the exhaust levels when the vehicle is not running or no vehicle is in the garage.

Other systems are known to have the exhaust monitoring device mounted on the vehicle so that when hazardous exhaust gas levels are detected, the engine may be shut off. However, these systems can only stop the exhaust system from emitting more gas and cannot mitigate the exhaust gas that is already emitted from the vehicle. For a person having multiple vehicles parked within a same garage structure, multiple monitoring devices must be used which can be costly. In addition, for people who lease or purchase vehicles on an annual basis, either a new monitoring device must be purchased and installed each time a vehicle is acquired or the monitoring device must be removed from each existing vehicle and installed on the new vehicle which may be time consuming if performed by the owner or costly if the removed by a third person such as a mechanic.

SUMMARY OF THE INVENTION

The present invention has the advantage of training a remote monitoring device within a closable structure remotely disposed from one or more vehicles for learning and storing an engine start and stop signal, for initiating the monitoring of the exhaust gas concentration level in the closable structure when remote engine start signals are received by the remote monitoring device, and for mitigating the exhaust gas emitted within the closable structure. The remote monitoring device activates mitigation devices in addition to warning indicators in response to detecting unsafe exhaust gas concentration level.

A method is provided for monitoring and mitigating exhaust gas emitted from a vehicle in a closable structure. A remote monitoring device within the closable structure is trained in response to a training signal transmitted from a remote transmitter device. A remote engine start signal is intercepted within a receiving circuit of the remote monitoring device during an actual remote engine start operation. The exhaust gas emitted from the vehicle is monitored in response to receiving the remote engine start signal. A determination is made if an exhaust gas concentration level is greater than a predetermined threshold. A control signal is transmitted to a mitigation device for mitigating the exhaust gas within the closable structure when the exhaust gas concentration level is greater than the predetermined threshold.

DETAILED DESCRIPTION OF PREFERRED EMBODIMENTS

Figure 1:
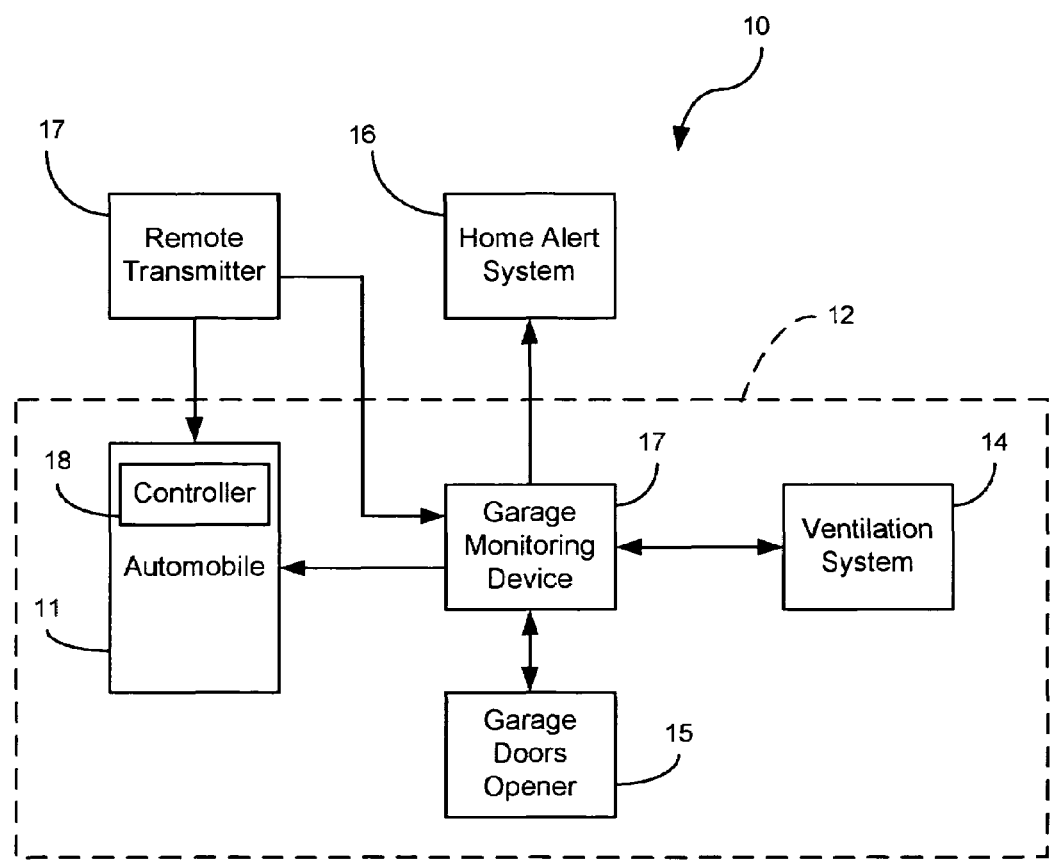
FIG. 1 a block diagram of an exhaust monitoring and mitigation system according to a preferred embodiment of the present invention.

FIG. 1 illustrates a block diagram for an exhaust monitoring and mitigation system 10 for the present invention. A vehicle 11 is parked in a closable structure 12 such as a garage. The vehicle 11 includes a combustion engine which emits exhaust fumes via an exhaust system to the environment surrounding the vehicle 12. The vehicle 12 is shown stored within the closable structure 12. Also disposed within the closable structure 12 is remote monitoring device 13. The remote monitoring device 13 monitors concentration of hazardous exhaust gases such as carbon monoxide. The remote monitoring device 13 is in communication with at least one exhaust mitigation device disposed in the closable structure 12. The mitigation device may include a garage door opening unit 15, a ventilation unit 14 such as exhaust fans which exhaust air from the interior to the exterior of the closable structure 12, or a engine controller or stop switch 18 disposed in the vehicle 11 for shutting off the engine. The remote monitoring device may communicate with the mitigation devices via a wireless connection or a hardwire communication line.

A remote transmitter device 17 is a wireless communication device or fob which allows an operator of a vehicle to send a remote engine start signal to the vehicle 11 for starting the engine of the vehicle 12. The remote transmitter device 17 can also transmit a remote engine stop signal to the vehicle 12 for shutting off the engine. The remote engine start signal transmitted by the remote transmitter 17 to the vehicle 11 is intercepted by the remote monitoring device 13. The remote monitoring device 13 in response to intercepting the remote engine start signal begins monitoring the exhaust gas concentration levels emitted from the vehicle 11. One of the benefits of initiating the monitoring system for exhaust gas after the receipt of the engine start signal is to conserve power consumed by the remote monitoring device 13 (i.e., by not having to continuously monitor the exhaust gas concentration level during engine off or when the vehicle is removed from the garage). When the remote monitoring device 13 has detected that the exhaust gas concentration level has exceeded a predetermined threshold, the remote monitoring device 13 activates at least one mitigation device for reducing exhaust gas within the closable structure 12 to a safe level. In a first preferred embodiment, to mitigate the exhaust gas from the closable structure 12, the remote monitoring device 13 transmits a control signal to activate a garage door opener 15 for actuating the garage doors to an open position. The garage door opener 15 may include a transmitter and receiver (or transceiver) for transmitting a feedback signal identifying the position of the garage door. For example, if the garage doors are already in the open position and unsafe exhaust gas concentration level is detected by the remote monitoring device 13, then an actuation of the garage door opener 15 would be unwanted since an actuation would close the garage doors thereby causing the exhaust gas concentration levels within the closable structure 12 to elevate after the garage doors have closed. The control signals provided by the remote monitoring device 13 and the feedback signal provided by the garage door opener 15 may be communicated by a dedicated communication line since both the remote monitoring device 13 and the garage door opener 15 are disposed within the closable structure 12 or may be communicated by a wireless signal.

In a second preferred embodiment, the remote monitoring device 13 may further communicate a second control signal to the exhaust ventilation system 14. When the exhaust ventilation system 14 is activated, exhaust gas from the vehicle 11 is discharged from the interior to the exterior of the closable structure 12. The exhaust ventilation system 14 may further include a transmitter and receiver (or transceiver) for communicating to and from the remote monitoring device 13. Ventilation feedback signals provide information as to whether the exhaust ventilation system 14 is currently operating. Providing the second control signal to actuate the exhaust ventilation system 14 while the exhaust system is operating may turn off the exhaust ventilation system 14 which would cause the exhaust gas concentration level in the closable structure 12 to elevate. The control signals provided by the remote monitoring device 13 and the ventilation feedback signal provided by the exhaust ventilation system 14 may be transmitted via an RF signal or a dedicated communication line since both the remote monitoring device 13 and the exhaust ventilation system 14 are disposed within the closable structure 12.

The remote monitoring device 13 may further communicate an alert signal to a home alert system 16. The home alert system 14 is disposed within the interior of a house (not shown). If the exhaust gas concentration level exceeds the predetermined threshold within the closable structure 12, the home alert system 14 upon receiving the alert signal provides a warning indicator to the operator or other occupants of the house that exhaust gas emitted from the vehicle 11 within the closable structure 12 have exceeded the predetermined threshold.

Figure 2:
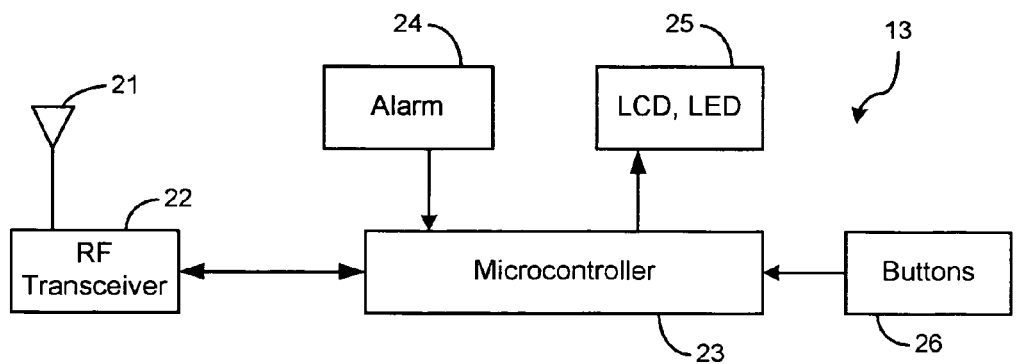
FIG. 2 a block diagram of a home alert unit according to a preferred embodiment of the present invention.

FIG. 2 illustrates a block diagram of the home alert system 16. In the preferred embodiment, the home alert system 16 includes a receiving antenna 21 attached to a receiving circuit 22 for receiving the transmitted alert signal from the remote monitoring device 13. A microcontroller 23 receives the alert signal from the receiving circuit 32 for processing the data modulated within the alert signal (i.e., if transmitted by wireless communication). Such data may include the exhaust gas concentration level currently existing within the closable structure 12 as well as the current status of the vehicle (engine running/engine off), exhaust ventilation system (on/off), and garage doors (open/closed). After demodulating and processing the data of the alert signal, the warning indicator is provided to the occupants of the house. The warning indicator may include an audible warning such as an alarm 34. The warning indicator may also include a visual indicator 35 such as a light, LED, or LCD readout. Each of the warning indicators may be activated individually or in combination. The LCD readout may provide detailed information about the exhaust gas concentration level or the activation status of the each of the mitigation devices. Buttons 36 may be provided for viewing the various operating conditions of the exhaust monitoring system. For example, if the display screen is not capable of providing all of the status information on one screen, then the buttons 36 may be used to display the status of the current air quality condition (exhaust gas concentration level) and the mitigation devices (ventilation exhaust system, garage door opener, and engine operating condition).

The remote monitoring device 13 (as shown in FIG. 2) may further communicate a third control signal such as a replicated remote engine stop signal to be transmitted to the vehicle 11 for shutting off the engine. Upon detecting that the exhaust gas concentration level is above the predetermined threshold, the replicated remote engine stop signal is communicated wirelessly to the engine controller or stop switch 18 disposed within the vehicle 11 for shutting off the engine. In alternative embodiments, a second predetermined threshold lower than the first may be used to determine whether engine operation can be restarted. In addition, the vehicle 11 may include an override control strategy whereby the engine is not shutdown if the transmission is in a gear other than park. If the transmission were in a gear other than park, this would indicate that an operator is in the vehicle and the vehicle is in the process of being moved. A monitoring system without an override control or some other type of out of gear detection system would transmit the replicated engine stop signal to the engine stop switch 18 upon detecting the elevated exhaust gas concentration level and would not detect that the operator is in the process of exiting the closable structure 12. This would create a nuisance to the operator if the replicated engine stop signal is repeatedly transmitted to the vehicle for shutting down the engine while the operator is attempting to remove the vehicle from the closable structure 12.

Figure 3:
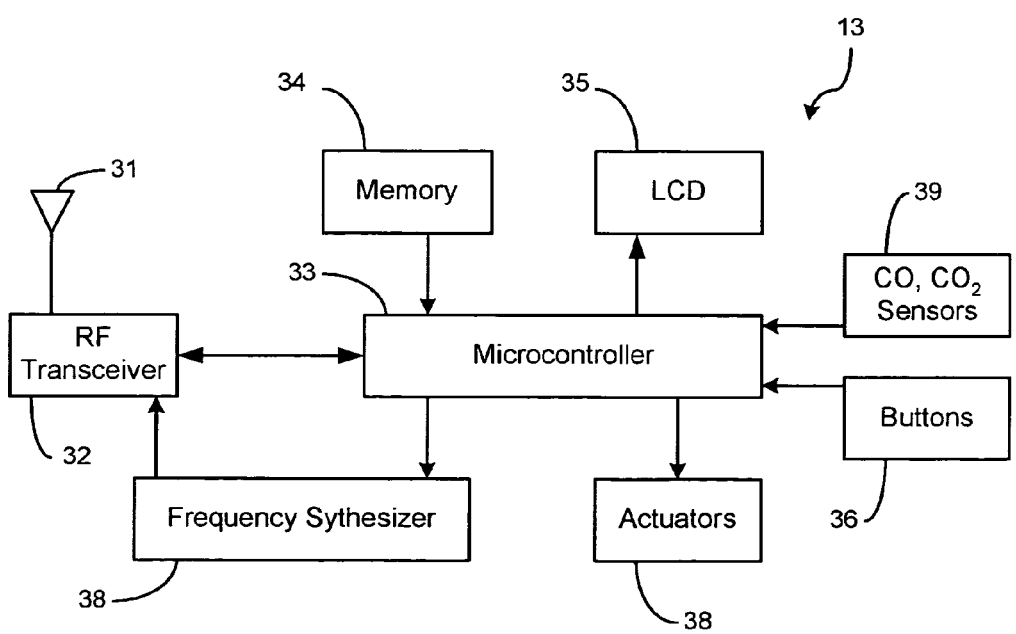
FIG. 3 a block diagram of remote monitoring device according to a preferred embodiment of the present invention.

FIG. 3 illustrates a block diagram of a remote monitoring device 13 which can be trained to identify remote engine start signals for one or more vehicles. The remote monitoring device 13 includes a receiving antenna 31 and a transceiver 32 for receiving and transmitting input and output signals, respectively. Alternatively, a transmitter and a receiver may be used. A training signal is transmitted from the remote transmitting device 12 to the remote monitoring device 17. The remote monitoring device 13 has stored in its memory a plurality of message protocols for decoding the training signal. The plurality of message protocols includes coding schemes and encryption algorithms used in systems for the various manufacturers with the monitoring device meant to be compatible.

To enable the remote monitoring device 13 to identify the respective remote engine start signal being utilized for a respective vehicle, the remote monitoring device 13 enters a learning mode operation. Thereafter, the remote transmitting device 17 transmits a training signal. The training signal transmitted by the remote transmitter device 17 may be a RF signal other than remote engine start signal. The training signal may be a transmitted signal selected from the group comprising said remote engine start signal, a remote engine stop signal, a remote door unlock signal, a remote door lock signal, a remote trunk unlock signal, and a remote panic alarm signal. The remote monitoring device 13 needs only to learn the transmitting identifier of the remote transmitting device 17 and the decoding scheme and decryption algorithm of the transmitted signal. Each transmitted signal from the remote transmitting device (e.g., start, stop, lock, unlock, unlatch, alarm) are encoded/encrypted on a same transmitted frequency and each remote transmitting device 17 is identifiable to the respective vehicle by the transmitting identifier.

Since various remote transmitting devices may utilize a different carrier frequency for transmitting a training signal, a frequency synthesizer 39 is provided for generating a plurality of specific frequency signals for tuning the receiving circuit 32 (i.e., transceiver) to the same frequency of the transmitted training signal. A microprocessor 33 controls the frequency synthesizer 35 to generate one of a plurality of frequencies associated with said predetermined message protocols for tuning the transceiver 32 to potentially match the frequency of the training signal. As the frequency synthesizer 35 generates a specific frequency for tuning the reception of the transceiver 32, a received signal strength indicator (RSSI) is generated for each specific frequency tuned to. The RSSI is an indication of the power received from the transmitted signal. For a given transmitted signal, when the transceiver 32 is tuned to the frequency of the transmitted signal, the RSSI will yield a high signal strength value above a predetermined value. An RSSI signal is provided to the microprocessor 33 via a dedicated RSSI line to determine if the RSSI is greater than the predetermined value. As a result, the microprocessor 33 monitors the RSSI of each tuned frequency as the training signal is being broadcast and as the tuning frequency of the transceiver 32 is changed. When the RSSI is above the predetermined value, the microprocessor 33 stores the frequency yielding the high RSSI value in memory and locks on to that frequency. Data modulated on the received training signal associated with the stored frequency is provided to the microprocessor 33 via a dedicated data line and is stored in memory. The memory may be allocated to store the data in the memory of the microprocessor 33 or may be the memory some other memory device such as EEPROM (not shown).

The microprocessor 33 has stored in memory the plurality of message protocols which include encryption algorithms and coding schemes from all desired remote engine start/stop devices. The microprocessor 33 uses the previously stored encrypted algorithms and coding schemes to decode which specific coding scheme and encrypted algorithm is used by the training signal. When the message is decoded and understood by the microprocessor 33, the encrypted algorithm, coding scheme, and associated frequency are stored in memory by the microprocessor 33. The microprocessor 33 can then receive and decode a remote engine start code, monitor exhaust concentration gas levels, and transmit a replicated engine stop code for a respective vehicle which it has previously learned. Remote start/stop signals for multiple vehicles may be learned and stored in the memory of the remote monitoring device 13.

The remote monitoring device 13 further includes sensors 39 that monitor for the exhaust gas (i.e., carbon monoxide). Data retrieved from the sensors 39 are provided to the microprocessor 33 for processing. The remote monitoring device 13 includes a display screen 35 such as a LCD display to visually display the current status of the exhaust gas concentration level and other pertinent information. At least one button 36 is provided for initiating the training mode. Other buttons may be used for changing the status of the display screen 35 or for controlling any audible or visual warning signals. The remote monitoring device 13 may also include actuators 38 for manually controlling at least one of the mitigation devices. The remote monitoring device 13 may also be trained to control the mitigation devices (e.g., garage door actuation) in the same manner as discussed for learning the engine start/stop signals.

Figure 4:
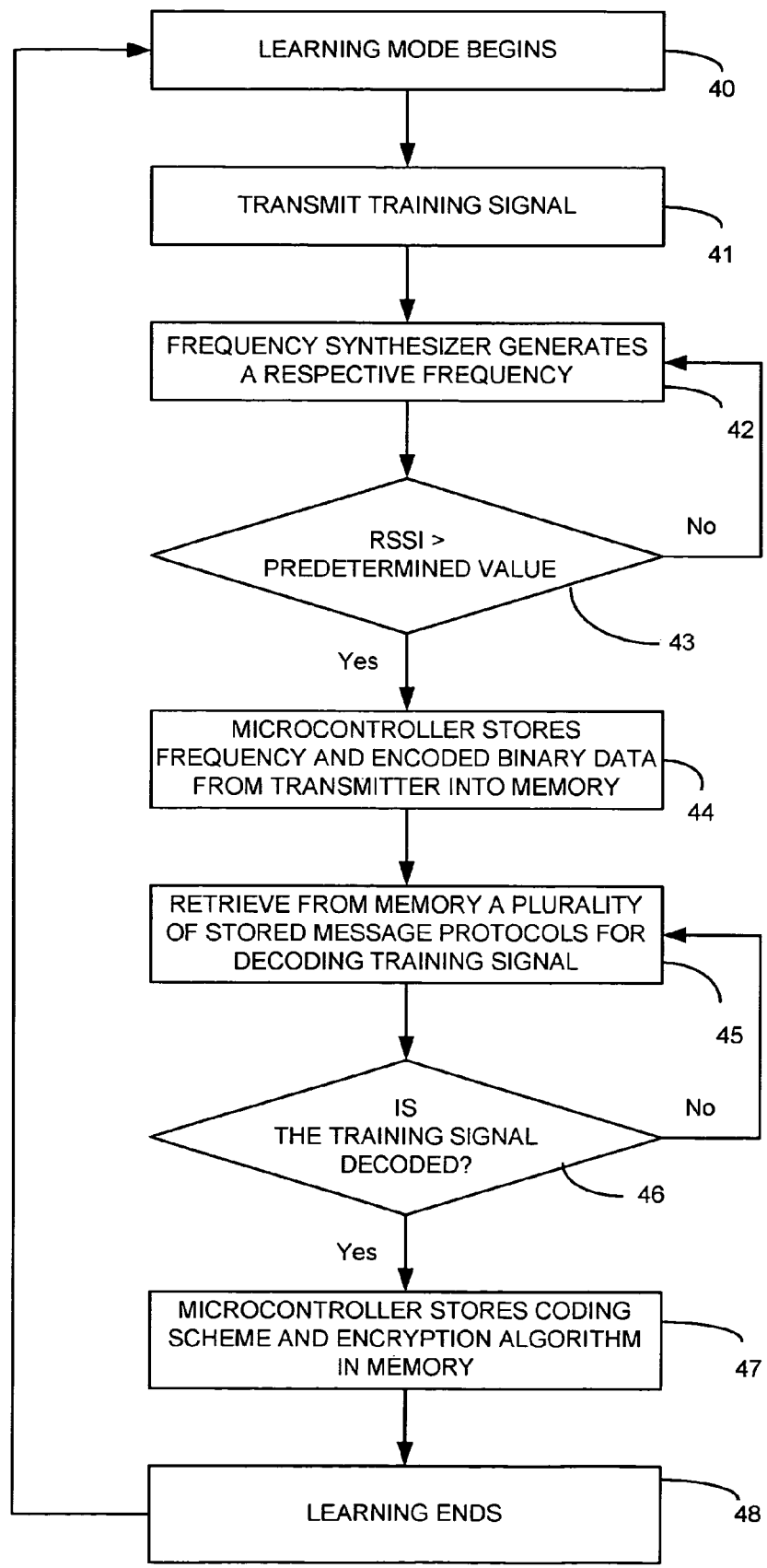
FIG. 4 is a flowchart of a method for training the remote monitoring device to learn a remote engine start and stop signal according to a preferred embodiment of the present invention.

FIG. 4 illustrates a block diagram for learning a remote start/stop signal transmitted by a remote transmitting device by a remote monitoring device. In step 40, a learning mode of a remote monitoring device is initiated. The learning mode may be initiated by a sequential actuation of buttons on the remote monitoring device. In step 41, a training signal such as a remote engine start signal is transmitted by actuating a respective button on a remote transmitting device. In step 42, a frequency synthesizer within the remote monitoring device generates one of a plurality of frequencies associated with the predetermined message protocols for tuning a transceiver to a respective frequency. In step 43, the microprocessor receives a RSSI signal from the transceiver via the dedicated RSSI line and determines if the RSSI signal is above a predetermined value. If a determination is made that the RSSI signal is not greater than the predetermined value, then a return is made to step 42 to generate a next frequency for tuning the transceiver. If the determination is made in step 43 that the RSSI signal is greater than the predetermined value, then the microprocessor stores the frequency associated with the high RSSI signal and the encoded binary data of the engine start signal in memory in step 44. This allows the microprocessor to retrieve the stored signal from memory for decoding the training signal without having to repetitiously transmit the training signal or hold a transmitter button until the training signal is decoded.

In step 45, the microprocessor retrieves from memory one of the plurality of previously stored message protocols for iteratively decoding the training signal stored in memory. The data rates of the plurality of previously stored message protocols are also stored in memory. This allows the remote monitoring device to select a stored message protocol having a same data rate as the training signal for quickly identifying which respective message protocol to use for decoding the training signal. In step 46, a determination is made whether the data from the training signal is decoded. If a determination is made that the training signal is not decoded, then a return is made to step 45 to retrieve a next message protocol stored in memory. If the determination is made in step 45 that the data of the transmitted signal is decoded, then the microcontroller stores the coding scheme, encryption algorithm, and associated frequency in memory in step 47. In step 48, learning ends and a return is made to step 40 to learn a next transmitted signal or otherwise the learning operation ends.

Figure 5:
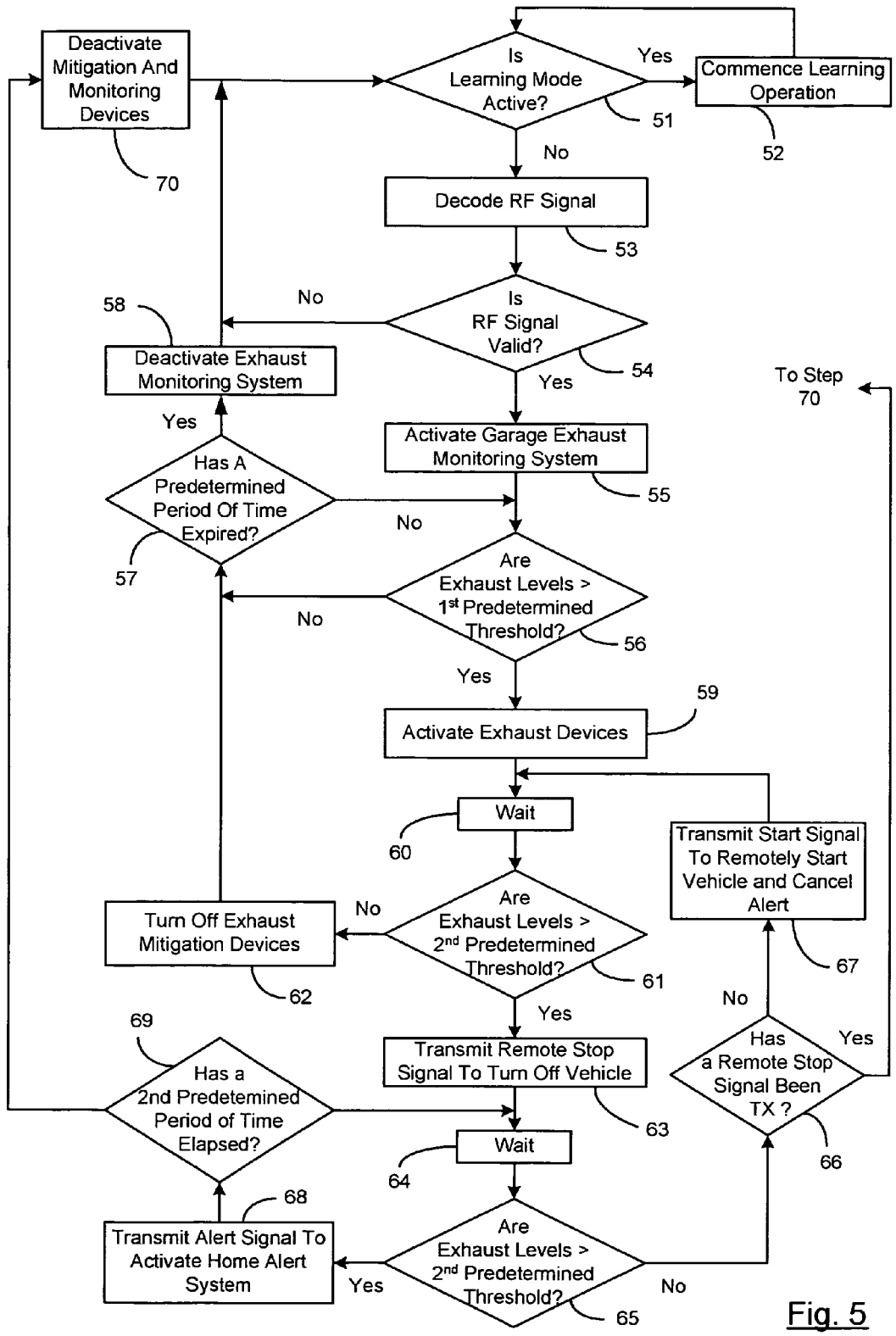
FIG. 5 is a flowchart of a method for monitoring and mitigating exhaust gas according to a preferred embodiment of the present invention.

FIG. 5. illustrates a preferred embodiment for monitoring an exhaust system for a vehicle parked within a closable structure. Upon receiving a RF signal, a determination is made, in step 51, whether a learning mode is activated. If a determination is made that learning mode is activated, the remote monitoring device commences a learning mode operation in step 52. If the determination was made in step 51 that the learning mode is not activated, then the monitoring device attempts to decode the RF signal in step 53 utilizing the message protocol previously trained to. In step 54, a determination is made whether the RF signal is a valid engine start signal previously learned and stored in memory. If a determination is made that the RF signal is not a valid engine start signal, then a return is made to step 51 to monitor for a next RF signal. If the determination is made in step 54 that a valid engine start signal is received, then the remote monitoring device commences monitoring the exhaust gas concentration level within the closable structure in step 55.

In step 56, a determination is made whether the exhaust gas concentration level is above a first predetermined threshhold. If a determination is made in step 56 that the exhaust gas concentration level is not greater than the first predetermined threshold, then a determination is made whether a first predetermined period of time has expired while the exhaust gas concentration level remain lower than the first predetermined threshold for at least in step 57. If the first predetermined period of time has expired while the exhaust gas concentration level has remained less than the first predetermined threshold, then it is assumed that the vehicle has left the closable structure or is turned off and the exhaust gas monitoring operation is terminated in step 58. A return is made to step 51 to monitor for a next RF signal. If the determination is made that the exhaust gas concentration level is greater than the first predetermined threshold, then at least one exhaust mitigation device is activated in step 59.

The monitoring system awaits a period of time in step 60 for the at least one exhaust mitigation device to mitigate the exhaust gas before making a determination whether the exhaust gas concentration level is above a second predetermined threshold in step 61. If the exhaust gas concentration level is not greater than the second predetermined threshold, then the exhaust mitigation devices are terminated in step 62. A return is made to step 57 to determine if the first predetermined period of time has elapsed while the exhaust gas concentration level remains below the first predetermined threshold. If the determination was made in step 61 that the exhaust gas concentration level is greater than the second predetermined threshold, then the remote monitoring device transmits a replicated engine stop signal to turn off the engine of the vehicle in step 63.

The monitoring system awaits a period of time in step 64 to allow the at least one mitigation device to mitigate the exhaust gas while the engine is stopped before determining whether the exhaust gas concentration level is greater than a second predetermined threshold in step 65. If a determination is made that the exhaust gas concentration level is below the second predetermined threshold in step 65, then a determination is made in step 66 whether a remote engine stop signal has been intercepted from the remote transmitting device. This indicates the operator intentions to shut the engine of the vehicle off. If a remote engine stop signal has been intercepted from the remote transmitting device, then the exhaust mitigation devices and the exhaust monitoring system is deactivated in step 70. A return is made to step 51 to await a next RF signal. If the remote monitoring device intercepts no remote engine stop signal, then a replicated engine start signal is transmitted by the remote monitoring device in step 67 to start the vehicle. Any alert signals to the operator or home alert unit are also canceled. A return is made to step 60 to continue monitoring the exhaust gas concentration level for determining whether the at least one exhaust mitigation device should remain active.

If the determination is made in step 65 that the exhaust gas concentration level is above the second predetermined threshold, then an alert signal is transmitted to a home alert system, in step 68, to alert occupants of the house of the unsafe condition. The alert signal may also be received by the remote transmitting device indicating the operator of the unsafe exhaust condition. A determination is made whether a second predetermined period of time has elapsed in step 69. If the second predetermined period of time has not elapsed, then a return is made to step 64 to wait and continue monitoring for the exhaust gas concentration levels. If the second predetermined period of time has elapsed, the mitigation devices and exhaust monitoring system is deactivated in step 70.

What is claimed:

1. A method for monitoring and mitigating exhaust gas emitted from a vehicle in a closable structure, said method comprising the steps of:
   training a remote monitoring device disposed within said closable structure in response to a training signal transmitted from a remote transmitter device;
   intercepting a remote engine start signal within a receiving circuit of said remote monitoring device during an actual remote engine start operation;
   monitoring exhaust gas emitted from said vehicle in response to receiving said remote engine start signal; and
   determining if an exhaust gas concentration level is greater than a predetermined threshold; and
   transmitting a control signal to a mitigation device for mitigating said exhaust gas within said closable structure when said exhaust gas concentration level is greater than said predetermined threshold.

2. The method of claim 1 wherein said remote engine start signal uses one of a plurality of predetermined message protocols, and wherein said step of training said remote monitoring device comprises the steps of:
   receiving said training signal from said remote transmitting device;
   iteratively decoding said training signal by utilizing said plurality of message protocols in succession until said training signal is successfully decoded; and
   setting up said remote monitoring device for active monitoring using said message protocol that successfully decoded said training signal.

3. The method of claim 2 wherein said data includes a transmitter identification uniquely identifying said remote transmitter device.

4. The method of claim 2 wherein said step of receiving said training signal from said remote transmitting device further includes the steps of:
   tuning a receiver of said remote monitoring device to one of a plurality of frequencies associated with said predetermined message protocols;

determining a signal strength associated with said tuned to frequency; and determining if said signal strength associated with said tuned to frequency is greater than a predetermined value;

if said signal strength is greater than said predetermined value, then continuing with said iterative decoding step, otherwise returning to said tuning step to tune to a different one of said frequencies.

5. The method of claim 1 wherein said step of transmitting said control signal to said mitigation device includes transmitting a replicated remote engine stop signal to an engine stop switch in said vehicle for shutting off an engine of said vehicle.

6. The method of claim 1 further comprising the step of transmitting an alert signal to a home alert unit, said home alert unit providing an audible notification in response to receiving said alert signal.

7. The method of claim 6 wherein said home alert unit further provides a visual notification in response to receiving said alert signal for providing a warning that said exhaust gas concentration level is above said predetermined threshold.

8. The method of claim 6 wherein said alert signal is received by said remote transmitting device for providing a warning to a user of said remote transmitter device.

9. The method of claim 1 further comprising the steps of:
monitoring exhaust gas concentration level after said engine is shutoff;
determining if said exhaust gas concentration level is below a second predetermined threshold; and
transmitting a replicated remote engine start signal to said vehicle for restarting said vehicle if said exhaust gas is below said second predetermined threshold.

10. The method of claim 1 wherein a control signal is transmitted to an exhaust ventilation system for ventilating said exhaust gas from said closable structure in response to said exhaust gas concentration level being greater than predetermined threshold.

11. The method of claim 1 wherein said control signal comprises an activating signal to a garage door opening device for opening a garage door for ventilating said exhaust gas from said closable structure.

12. The method of claim 2 wherein said remote transmitting device is trained to identify message protocols and store identification codes of a plurality of remote transmitter devices.

13. The method of claim 1 wherein said training signal transmitted from said remote transmitting devices includes a training signal selected from the group comprising a remote engine start signal, a remote engine stop signal, a remote door unlock signal, a remote door lock signal, a remote trunk unlock signal, and a panic alarm signal.

14. An engine exhaust monitoring system for monitoring and mitigating exhaust gas emitted from a vehicle during a remote engine startup of a vehicle in a closable structure, said system comprising:
a remote monitoring device disposed in said closable structure and remote from said vehicle for intercepting a remote engine start signal and for monitoring said exhaust gas concentration level emitted from said vehicle;
a remote transmitting device for transmitting a remote engine control signal;
a home alert unit for receiving an alert signal identifying an unsafe concentration of exhaust gas present in said closable structure, wherein said home alert unit outputs a warning indicator when said exhaust gas is greater than a predetermined threshold; and
at least one mitigation device for mitigating said exhaust gas emitted from said vehicle;
wherein said remote transmitting device initiates monitoring of said exhaust gas concentration level within said closable structure upon intercepting said remote engine start signal, wherein said remote monitoring device transmits at least one control signal for activating said at least one mitigation device if said exhaust gas concentration level exceeds a first predetermined threshold, and wherein said remote monitoring device transmits said alert signal to said home alert unit when transmitting said control signal.

15. The system of claim 14 wherein said remote monitoring device includes a training program for iteratively decoding and decrypting a training signal associated with a remote transmitting device by utilizing a plurality of message protocols successively until said training signal is successfully decoded.

16. The system of claim 14 wherein said at least one control signal includes a ventilation activation signal and said at least one mitigation device includes an exhaust ventilation unit for removing said exhaust gas from said closable structure.

17. The system of claim 14 wherein said at least one control signal includes a garage door activation signal and said at least one mitigation device includes a garage door opener unit.

18. The system of claim 14 wherein said at least one control signal includes a replicated remote engine stop signal and said at least one mitigation device includes an engine controller in said vehicle.

19. The system of claim 18 wherein said remote monitoring device monitors said exhaust gas within said closable structure after said engine stop signal is transmitted, said remote monitoring device transmitting a replicated remote engine start signal to said vehicle for restarting said vehicle after said exhaust gas concentration level drops below a second predetermined threshold.

20. The system of claim 14 wherein said remote monitoring device transmits an alert signal to said remote transmitter device in response to said exhaust gas concentration level, and wherein said remote transmitter device provides a warning indicator for alerting a person carrying said remote transmitting device of said unsafe exhaust gas concentration level in response to receiving said alert signal.

* * * * *